United States Patent [19]
Wieczorek

[11] Patent Number: 5,584,048
[45] Date of Patent: Dec. 10, 1996

[54] BEACON BASED PACKET RADIO STANDBY ENERGY SAVER

[75] Inventor: Alfred B. Wieczorek, Plantation, Fla.

[73] Assignee: Motorola, Inc., Schaumburg, Ill.

[21] Appl. No.: 329,801

[22] Filed: Oct. 26, 1994

Related U.S. Application Data

[63] Continuation of Ser. No. 123,143, Nov. 16, 1992, abandoned, which is a continuation of Ser. No. 568,801, Aug. 17, 1990, abandoned.

[51] Int. Cl.$^6$ ..................................... H04B 7/00
[52] U.S. Cl. .................. 455/38.3; 455/54.2; 455/70; 455/343
[58] Field of Search ................. 455/38.2, 38.3, 455/54.1, 54.2, 51.1, 343, 70, 38.1; 375/107; 340/825.44, 825.2, 825.21, 825.14

[56] References Cited

U.S. PATENT DOCUMENTS

| | | | |
|---|---|---|---|
| 4,449,248 | 5/1984 | Leslie et al. | 455/343 |
| 4,509,199 | 4/1985 | Ichihara | 455/70 |
| 4,577,315 | 3/1986 | Otsuka | 370/95 |
| 4,756,010 | 7/1988 | Nelson et al. | 455/38.1 |
| 4,794,649 | 12/1988 | Fujiwara | 455/9 |
| 4,961,073 | 10/1990 | Drapac et al. | 455/38.3 |
| 4,964,121 | 10/1990 | Moore | 370/100.1 |
| 5,058,203 | 10/1991 | Inagami | 455/89 |
| 5,230,084 | 7/1993 | Nguyen | 455/343 |
| 5,241,691 | 8/1993 | Owen | 455/54.2 |
| 5,252,963 | 10/1993 | Snowden et al. | 340/825.44 |
| 5,309,153 | 5/1994 | Gaskill et al. | 455/38.2 |

Primary Examiner—Edward F. Urban
Attorney, Agent, or Firm—Anthony G. Sitko; Jeffrey G. Toler

[57] ABSTRACT

A method of conserving battery energy within two-way radios by periodically de-activating the radios for relatively short time periods. The transmission and reception of communication requests are synchronized to occur during concurrent periods of activation. Following receipt of a communication request, requestor and target remain continuously activated for only the duration of the transaction. Synchronization of radio activation and de-activation is maintained by a synchronization beacon transmitted by a base station or a transmitting portable radio.

11 Claims, 2 Drawing Sheets

SYNC=$5575F5FF77FF

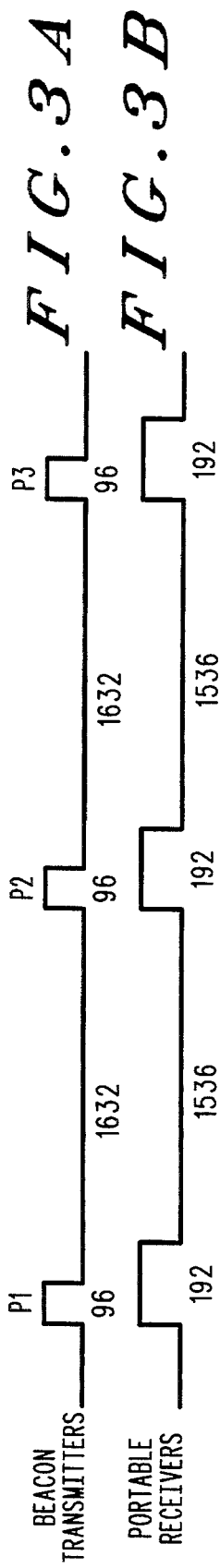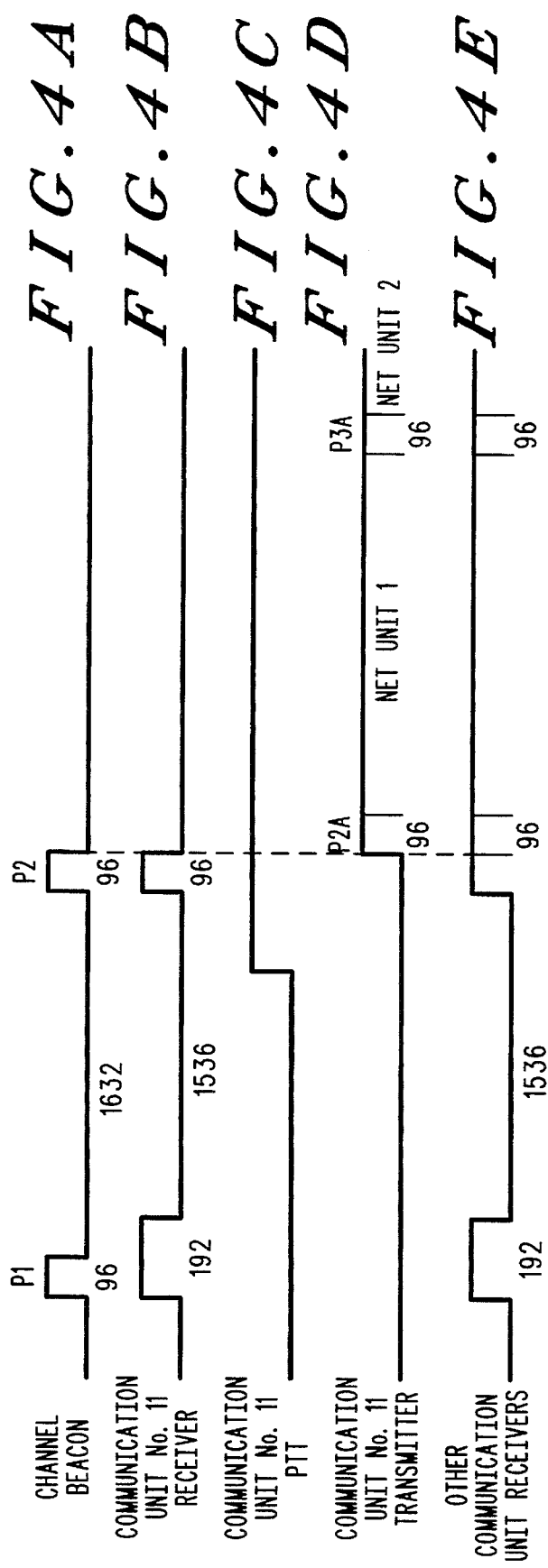

BEACON BASED PACKET RADIO STANDBY ENERGY SAVER

This is a continuation of application Ser. No. 08/123,143 filed Nov. 16, 1992 and now abandoned, which is a continuation of application Ser. No. 07/568,801, filed Aug. 17, 1990 and now abandoned.

TECHNICAL FIELD

This invention relates generally to communication systems and more specifically to two-way radio based communication systems.

BACKGROUND

Radio based communication systems are known. Such systems typically transmit and receive on an assigned frequency pair or on a single frequency in a TDM format. The assigned frequency or frequency pair may be selected either by the user or, in the case of a trunked system, assigned by a system controller. Other radio communication systems transmit from radio-to-radio on a single frequency in a simplex mode.

For increased flexibility radio communication units are often constructed to operate from portable battery power sources. The use of light-weight battery power sources has contributed to the utility of hand-held portables.

Batteries, while providing the greatest mobility, also suffer from disadvantages associated with limited, and sometimes unpredictable, operational life. Factors affecting battery life include transmitting time as well as time spent monitoring incoming messages.

While significant battery power is required by a radio transmitting a message, more total radio time (and resultant battery capacity) may be consumed monitoring for incoming messages. A radio operator, in most cases, is not able to schedule communication transactions. A radio, consequently, must remain in an activated state, monitoring for incoming signals, during relatively long periods of inactivity.

Since the utility of a two-way portable radio lies in its ability to transmit and receive messages, the utility of a radio is increased by extending the period between battery replacement by conserving battery capacity. Accordingly, a need exists for a method to conserve battery capacity while monitoring for messages without interfering with radio operation.

SUMMARY OF THE INVENTION

Pursuant to one embodiment of the invention a communication system is constructed to contain a radio beacon which periodically transmits a synchronization pulse. Also contained within the system is a communication unit that receives the periodic synchronization pulse. Substantially following the synchronization pulse (and in the absence of other radio activity) the communication unit substantially deactivates until the next synchronization pulse. In the event of a need for a communication transaction the communication unit transmits or, upon occasion, receives communication requests immediately following the synchronization pulse in synchronism with the synchronization pulse.

Following the synchronization pulse communication units are activated for purposes of monitoring for communication requests for only a short interval (monitoring window). At the completion of the monitoring window the receivers are again substantially de-activated. Receivers are typically activated in this embodiment, five times per second for a period of approximately twenty-five milliseconds with resulting on-time of less than fifteen percent of total time.

Requesting communication units, to initiate a communication transaction, must transmit communication requests during the monitoring window. Once the communication request is received by target units both requestor and target units remain in continuous operation for the duration of the communication transaction.

Coordination of transmissions during the monitoring window is maintained by reference to a system beacon. The system beacon periodically transmits a synchronization pulse. The synchronization pulse contains a number of synchronization bits as well as an identifier packet which may contain specific information such as call routing or an ID number of a specific talk-group. Communication units seek the group synchronization pulse upon activation.

Upon locating a synchronization pulse a communication unit first synchronizes to the synchronization bits and then uses such synchronization to read and identify the transmitted ID bits within the synchronization pulse. Such a process may be repeated until the proper talk-group is located.

Once the proper talk-group is located, receipt of a synchronization pulse sets two internal timers within the communication unit. The first timer maintains the communication unit in an activated state for the monitoring window substantially equal in time to the synchronization pulse.

The second timer, also set by the synchronization pulse, is for the period of de-activation of the communication unit between synchronization pulses. The timer is set to re-activate the communication unit sufficiently in advance of the next synchronization pulse to allow for power-up and reception of the next synchronization pulse.

If a radio operator should press the push-to-talk (PTT) button on the communication unit while in the inactive state the communication unit waits for the next synchronization pulse to begin transmission. The communication unit waits until after the synchronization pulse to time such transmission to be within the monitoring window of other communication units. Since a synchronization pulse, in one embodiment, occurs on the average of once every one-hundred milliseconds an operator is normally unaware of any delay.

BRIEF DESCRIPTION OF THE DRAWINGS

FIG. 3 is a timing diagram showing synchronization pulses and activation time of monitoring communication units.

FIG. 4 is a timing diagram showing the monitoring and transmission activity of two communication units as well as a channel beacon.

BEST MODE FOR CARRYING OUT THE INVENTION

Figure 1A:
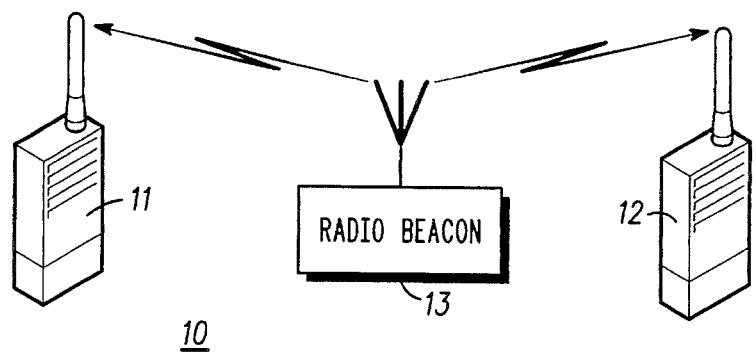
FIG. 1a is a block diagram of a communication system using a radio beacon transmitting synchronization pulses.

Shown (FIG. 1a) is a depiction of a two-way radio communication system generally (10) under one embodiment of the invention. Two mobile communication units (11 and 12) are shown in an idle state.

Figure 1B:
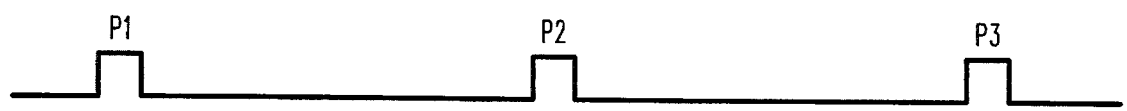
FIG. 1b is a timing diagram showing the transmission of synchronization pulses.

Also shown (FIG. 1a) is a radio beacon (13) transmitting a periodic synchronization pulse (FIG. 1b) to the communication units (11 and 12). The periodic synchronization pulse serves to maintain synchronization between communication units (11 and 12) by allowing each communication unit (11 and 12) to achieve bit synchronism with the common radio beacon (13).

Figure 2:
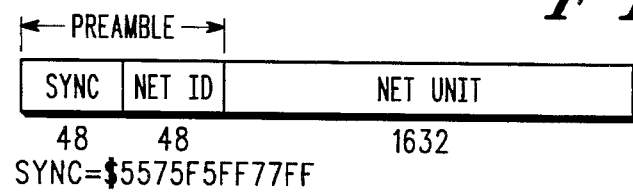
FIG. 2 is a timing diagram showing a synchronization pulse within a radio transmission packet.

Contained within the synchronization pulses (FIG. 1b, P1 through P3) are a series of data bits (Preamble, FIG. 2) used to provide bit synchronization to the communication units (11 and 12) as well as an ID number of the system from which the synchronization pulses originate. The preamble (FIG. 2) demonstrates one embodiment of a synchronization pulse. The preamble, as shown, contains forty-eight synchronization bits and an additional forty eight bits containing the ID number of the communication system. The remaining bits shown in FIG. 2 (one-thousand, six-hundred, thirty-two) represent a time period during part of which communication units (11 and 12) may monitor for incoming messages or transmit communication requests and part of which communication units (11 and 12) may be de-activated.

In one embodiment of the invention a time period equal to and following the synchronization pulse (ninety-six bits) is allotted for the reception or transmission of messages. FIG. 3 is a graphical depiction of radio beacon activity (FIG. 3a) relative to communication unit, idealized activation time (FIG. 3b). As shown the communication units (11 and 12) remain activated for the ninety-six bit synchronization pulse plus ninety-six bits additional time for reception or transmission of communication requests.

If one of the communication units (11 or 12) were to initiate a communication request then the situation in FIG. 4 would exist. As shown, between synchronization pulse P1 and P2, the radio operator activates the push-to-talk (PTT) button (FIG. 4c) on the communication unit (11, FIG. 1). This communication unit (11), on the other hand, does not respond until after the reception of the next synchronization pulse.

Prior to reception of the next synchronization pulse (P2) the communication unit (11) re-activates for reception of the synchronization pulse (P2). The communication unit (11) receiver receives, synchronizes and decodes the ID within the synchronization pulse.

After decoding and reading the group ID the communication unit (11), in response to activation of the PTT button, transmits (FIG. 4d) a communication request at the end of the synchronization pulse (P2). The communication request is ninety-six bits long (containing an ID of target communication unit(s) (12) and is followed by encoded voice and information data.

Target communication units (12) monitoring for communication requests (FIG. 4e) after the synchronization pulse (P2) recognize the transmitted request by the target specific information contained therein and, in response, remain active after receipt of the request. Voice data and signalling information are then transmitted in a normal manner until time for the next synchronization pulse.

At the time of the next synchronization pulse the communication unit (11) now transmits a substitute synchronization pulse in place of the radio beacon (13, FIG. 1). The radio beacon (13), also monitoring for communication requests following synchronization pulse P2, receives the communication request from the communication unit (11) and suspends transmissions pending completion of transmissions from the transmitting communication unit (11).

Upon completion of the communication transaction, the communication unit (11) transmits a termination control bit indicating release of the PTT button on the communication unit (11). Release of the PTT button on the communication unit (11) causes the requesting communication unit (11) and target communication unit (12) to return to a de-activated state until the next synchronization pulse. Release of the PTT button within the communication unit (11) also causes the radio beacon (13, FIG. 1) to resume operation, transmitting synchronization pulses as previously described substantially following completion of the last packet.

During the period involving the communication transaction the transmitting communication unit (11) periodically suspends transmission of voice data for transmission of the system synchronization pulse (P2A and P3A, FIG. 4d). The system synchronization pulse transmitted by the communication unit (11) is substantially identical to the beacon system synchronization pulse (FIG. 3A) except for ID and a slight time shift. The ID transmitted within the communication unit synchronization pulse is the ID of the transmitting communication unit (11). The slight time shift is because the communication unit (11) synchronization pulses (P2A and P3A) repeat at a point substantially following where the beacon synchronization pulses (P2 and P3, FIG. 3A) would have occurred if the beacon (13) were still transmitting.

Figure 5:
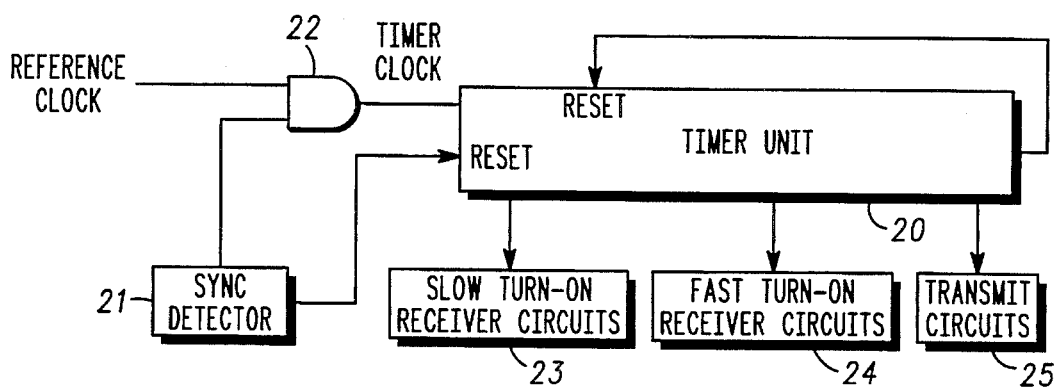
FIG. 5 is a block diagram of the internal timer within a communication unit under the invention.

During transmission of the synchronization pulse by the communication unit (11) communication units remain synchronized to the substituted synchronization pulse as described above by recognizing the substituted synchronization pulse within the monitoring window as a response. The beacon (13) also synchronizes to the synchronization pulse transmitted by the communication unit (11). Following receipt of the termination control bit the beacon resumes operation, transmitting the next synchronization pulse. Control of communication units (11 and 12) from a de-activated state to an activated state is under control of a timer (20, FIG. 5) internal to each communication unit (11 and 12). As shown the timer (20) is reset by detection of the sync pulses generated by a sync detector (21). The synch detector (21) provides an output upon detection of the system synchronization pulse (preamble, FIG. 2.).

After detection of the preamble (FIG. 2) the timer unit remains activated for additional time to detect communication requests contained within the ninety-six bits (as indicated by counting ninety-six pulses from the timer clock (22)) following the synchronization pulse. After timing for ninety-six pulses the substantially de-activates the communication units (11 and 12).

Where the synch detector (21), instead, detects a substituted synchronization pulse from a transmitting communication unit transmitting to a different communication unit the synch detector (21) recognizes the substituted pulse, synchronizes to the substituted pulse, and again substantially de-activates.

After de-activation of the communication units (11 and 12) the internal clock (22) and timer unit (20) continue to function. Contained within the timer unit is a time value calculated to re-activate the communication unit sufficiently in advance of the synchronization pulse to allow reception of the synchronization pulse. As shown separate outputs from the timer unit are provided for slow turn-on receive circuits (23), fast turn-on receive circuits (24) and transmit circuits (25). In one embodiment of the invention values entered into each timer function may be varied to accommodate other parameters such as VCO load impedance changes caused by frequency changes (from receive to transmit), or propagation delay to and front remote communication units.

What is claimed is:

1. A method for saving battery power within a plurality of communication units, each of the communication units including a radio frequency stage and a timing stage, of a radio frequency communication system, such method comprising the steps of:

transmitting a periodic synchronization pulse by a base site;

synchronizing the plurality of communication units for periodic activation prior to the periodic synchronization pulse;

transceiving a target specific access request associated with at least one communication unit within a time window, the target specific access request being transmitted by a first communication unit and received by at least one communication unit of the plurality of communication units;

maintaining synchronization of the plurality of communication units by transmitting second synchronization pulse by the at least one communication unit instead of the base site; and following the time window, placing the remaining communication units not associated with the target specific access request in an energy saving mode by deactivating the radio frequency stage within the remaining communication units while allowing the timing stage to continue operating.

2. The method as in claim 1 further comprising decoding the target specific access request by the at least one communication unit and identifying at least one other communication unit as a target communication unit of the target specific access request.

3. The method as in claim 2 further comprising the step of defining the at least one and the at least one other communication units as associated communication units.

4. The method of claim 3 further including the step of reactivating the remaining communication units of the plurality of communication units, exclusive of the associated communication units for receipt of a next periodic synchronization pulse.

5. The method of claim 1, wherein the timing stage comprises an internal clock and a timer unit.

6. The method of claim 5, wherein the timing stage further comprises a synchronization detector coupled to the timer unit.

7. The method of claim 1, wherein the radio frequency stage comprises a receiving circuit and a transmitting circuit.

8. A method of synchronizing a radio frequency communication system having a base site and a plurality of communication units for power savings, such method comprising the steps of:

transmitting a first synchronization pulse having a pulse duration by the base site;

synchronizing the plurality of communication units to the first synchronization pulse;

transceiving a target specific access request between a first communication unit and a second communication unit within a time window associated with the pulse duration of the first synchronization pulse;

maintaining synchronization of the plurality of communication units by transmitting a second synchronization pulse by one of the first and second communication units instead of the base site;

deactivating a radio frequency stage within each of the plurality of communication units exclusive of the first and second communication units after the time window has expired;

starting a timer in at least one of the communication units, the timer having a value based on a predetermined time interval between the first synchronization pulse and the second synchronization pulse; and reactivating, upon expiration of the timer, the radio frequency stage within each of the plurality of communication units in advance of the second synchronization pulse.

9. The method of claim 8, wherein the timer value is greater then the pulse duration and less than the predetermined time interval.

10. The method as In claim 9 further including the step of reactivating the plurality of communication units in advance of a next synchronization pulse.

11. The method of claim 9, wherein the timer value is greater then about half of the predetermined time interval and is less than the predetermined time interval.

* * * * *